US011413725B2

United States Patent
Nakayama et al.

(10) Patent No.: US 11,413,725 B2
(45) Date of Patent: Aug. 16, 2022

(54) VACUUM PAD

(71) Applicant: SMC CORPORATION, Chiyoda-ku (JP)

(72) Inventors: Toru Nakayama, Soka (JP); Toru Sugiyama, Abiko (JP); Noriyuki Miyazaki, Kashiwa (JP); Masaru Saitoh, Joso (JP)

(73) Assignee: SMC CORPORATION, Chiyoda-ku (JP)

( * ) Notice: Subject to any disclaimer, the term of this patent is extended or adjusted under 35 U.S.C. 154(b) by 492 days.

(21) Appl. No.: 16/266,131

(22) Filed: Feb. 4, 2019

(65) Prior Publication Data
US 2019/0240813 A1  Aug. 8, 2019

(30) Foreign Application Priority Data
Feb. 5, 2018 (JP) .............................. JP2018-018179

(51) Int. Cl.
B25B 11/00 (2006.01)
B25J 15/06 (2006.01)

(52) U.S. Cl.
CPC ......... *B25B 11/005* (2013.01); *B25J 15/0683* (2013.01)

(58) Field of Classification Search
CPC .... B25B 11/005; B25B 11/00; B25J 15/0616; B25J 15/0683; B25J 15/06; B66C 1/0293; B65G 47/91
See application file for complete search history.

(56) References Cited

U.S. PATENT DOCUMENTS

| 3,558,171 A * | 1/1971 | netsch | B66C 1/0293 313/395 |
| 3,750,365 A * | 8/1973 | Darby, Jr. | B65B 43/26 53/459 |
| 4,749,219 A * | 6/1988 | Bolle, Jr. | B25J 15/0616 271/103 |
| 4,787,812 A * | 11/1988 | Gopfert | B66C 1/0212 414/737 |
| 5,688,008 A * | 11/1997 | Hansch | B65H 3/0883 271/103 |

(Continued)

FOREIGN PATENT DOCUMENTS

DE 33 24 441 A1 10/1984
DE 297 13 002 U1 9/1997
(Continued)

OTHER PUBLICATIONS

Extended European Search Report dated Jul. 8, 2019 in European Patent Application No. 19155088.8 citing documents AO-AQ therein, 8 pages.
(Continued)

Primary Examiner — Joseph J Hail
Assistant Examiner — Arman Milanian
(74) Attorney, Agent, or Firm — Oblon, McClelland, Maier & Neustadt, L.L.P.

(57) ABSTRACT

A vacuum pad suctions a workpiece by utilizing a vacuum pressure, and includes a support member having a vacuum passage inside, a bellows secured to the support member, and a restriction member attached to an inner side of the bellows. When the bellows is contracted, the restriction member comes into the vacuum passage.

16 Claims, 12 Drawing Sheets

(56) References Cited

U.S. PATENT DOCUMENTS

| | | | | |
|---|---|---|---|---|
| 6,502,808 | B1* | 1/2003 | Stone | B23B 31/307 |
| | | | | 269/21 |
| 6,979,032 | B2* | 12/2005 | Damhuis | B25J 15/0052 |
| | | | | 294/185 |
| 7,000,964 | B1* | 2/2006 | Porras | B25J 15/0616 |
| | | | | 294/186 |
| 8,684,434 | B2* | 4/2014 | Lomerson, Jr. | B25J 15/0633 |
| | | | | 294/186 |
| 2002/0011735 | A1* | 1/2002 | Nagai | B25J 15/0616 |
| | | | | 294/189 |

FOREIGN PATENT DOCUMENTS

| | | |
|---|---|---|
| FR | 2 967 370 A1 | 5/2012 |
| JP | 5-35973 | 9/1993 |
| JP | 2002-46090 A | 2/2002 |
| JP | 2006-212718 A | 8/2006 |
| WO | WO 20171159986 A | 9/2017 |

OTHER PUBLICATIONS

Japanese Office Action dated Sep. 21, 2021 in Japanese Patent Application No. 2018-018179 (with unedited computer generated English translation), citing documents AO through AQ therein, 8 pages.

* cited by examiner

VACUUM PAD

CROSS-REFERENCE TO RELATED APPLICATION

This application is based upon and claims the benefit of priority from Japanese Patent Application No. 2018-018179 filed on Feb. 5, 2018, the contents of which are incorporated herein by reference.

BACKGROUND OF THE INVENTION

Field of the Invention

The present invention relates to a vacuum pad for suctioning a workpiece by utilizing a vacuum pressure.

Description of the Related Art

Heretofore, there has been known a vacuum pad for suctioning a workpiece by exerting a vacuum pressure on a suction surface of the pad and for transporting the workpiece. For example, in the case where the workpiece is held inclined when suctioned by the vacuum pad, the pad is not in close contact with the workpiece, so that the vacuum pressure does not effectively act on the workpiece.

To solve this, there is one wherein a pad portion is made to be swingable through a ball joint or a pad per se is configured in the form of a bellows to make it possible that even an inclined surface can also be suctioned reliably (refer to Japanese Utility Model Publication No. 05-035973).

SUMMARY OF THE INVENTION

However, in the case where the pad portion is enabled to be swingable or in the case where the pad per se is configured in the form of a bellows, the workpiece suctioned by the pad is swingable even after the suction. This causes the workpiece to be swung during a transporting step, and thus, an anxiety arises in that a deviation occurs in positioning the workpiece. In particular, in the case where the workpiece is transported at a high speed, the workpiece is subjected to a large swing motion and is occasionally liable to fall from the pad due to the inertia.

The present invention has been made to solve the problems like these. It is an object of the present invention to provide a vacuum pad which is capable of enabling the pad to be in close contact with a workpiece even when a suctioned surface of the workpiece is inclined, and which is also capable of preventing the swing motion of the workpiece by stabilizing the posture of the workpiece after a suction operation.

A vacuum pad according to the present invention is a vacuum pad for suctioning a workpiece by utilizing a vacuum pressure, and the vacuum pad includes a support member including a vacuum passage inside, a bellows secured to the support member, and a restriction member attached to an inner side of the bellows, wherein the restriction member comes into the vacuum passage when the bellows is contracted.

According to the aforementioned vacuum pad, because the restriction member attached to the bellows comes into the vacuum passage of the support member when the bellows is contracted, the inclination of the restriction member is prevented, so that the holding posture of the workpiece becomes stable.

In the aforementioned vacuum pad, it is preferable that an inner ring be attached to an inner wall of the bellows. With this configuration, the bellows is restrained from being crashed to become flat.

Further, it is preferable that the restriction member include a sleeve portion configured to be inserted into the vacuum passage and a flange portion extending outward from one end portion of the sleeve portion and that a tip end of the flange portion engage with an inner wall of the bellows. With this configuration, it is possible to attach the restriction member to the inner side of the bellows in a simple configuration. Further, in the case where a bag or the like that contains a processed product having fluidity is suctioned and transported as a workpiece, the workpiece is restrained from being drawn inside the vacuum pad while being deformed.

In this case, it is preferable that another end portion of the sleeve portion be formed as a tapered surface becoming thinner toward an end and that an end portion of the vacuum passage be formed as a tapered surface expanding in diameter. When the bellows is not contracted, the tapered surface of the sleeve portion may face the tapered surface of the vacuum passage through a predetermined gap, and the restriction member may be spaced apart from the support member in an axial direction. With this configuration, even in the case where the suctioned surface of the workpiece is inclined, the bellows can be in close contact with the workpiece while being bent with no problem. In particular, when the restriction member is spaced apart from the support member in the axial direction with the bellows not contracted, it is possible to increase the degree of freedom in the bending deformation of the bellows.

Further, it is preferable that the sleeve portion be provided with a vertical hole penetrating in an axial direction and a horizontal hole communicating with the vertical hole and opening in a side surface of the sleeve portion. Alternatively, it is preferable that the sleeve portion be provided with a vertical hole penetrating in an axial direction, that an outer circumferential surface of the sleeve portion be provided with a slit-shape groove extending in the axial direction, and that the flange portion be provided with a through hole penetrating in a thickness direction and being connected to the groove. With this configuration, the state that the bellows is contracted and the state that the workpiece is suctioned can be kept stably by the vacuum pressure.

Further, in the case where it is required not to leave any suction mark on a workpiece, it is preferable that the flange portion have a shape covering a lower end portion of the bellows. With this configuration, because what is brought into contact with the workpiece is not the bellows but the restriction member, no suction mark remains on the workpiece.

Furthermore, in the case where the electrification of the workpiece is required to be avoided, it is preferable that the restriction member be formed of a metal material or a conductive resin material. With this configuration, even when the restriction member is electrified upon contact with the workpiece, it is possible to remove such electrification.

In the vacuum pad according to the present invention, because the restriction member attached to the bellows comes into the vacuum passage of the support member when the bellows is contracted, the inclination of the restriction member is prevented. Accordingly, the holding posture of the workpiece becomes stable, and the workpiece is not swung when the workpiece is suctioned and transported.

The above and other objects, features, and advantages of the present invention will become more apparent from the

DESCRIPTION OF THE PREFERRED EMBODIMENTS

Figure 1:
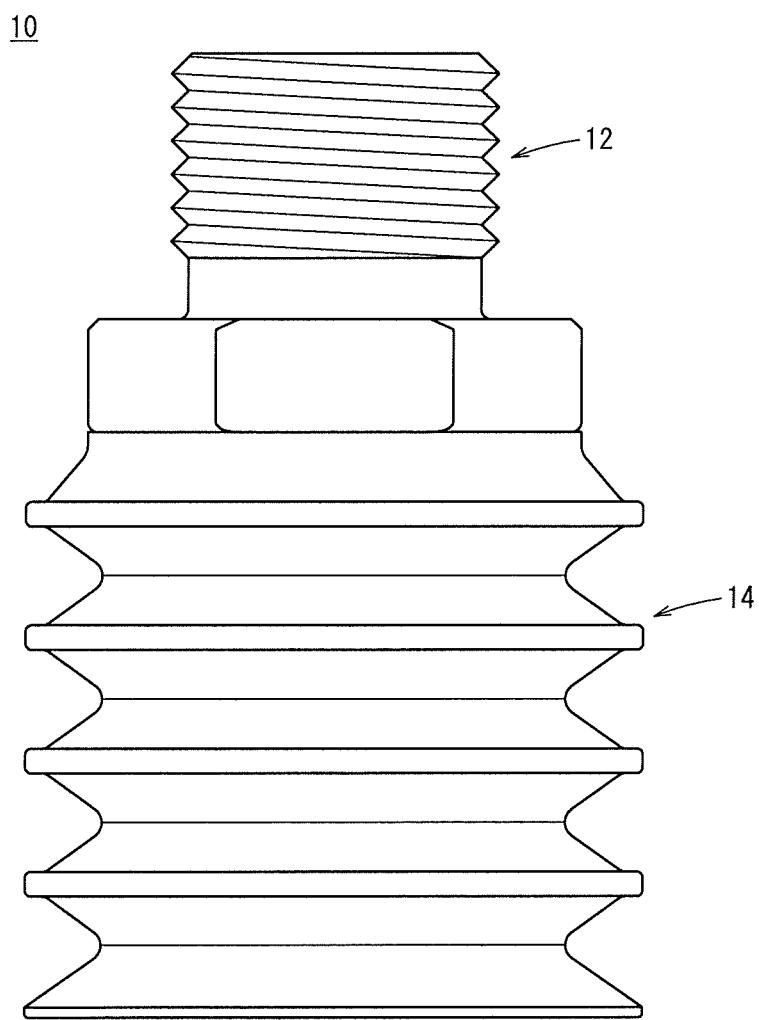
FIG. 1 is a front view of a vacuum pad according to a first embodiment of the present invention.
Figure 2:
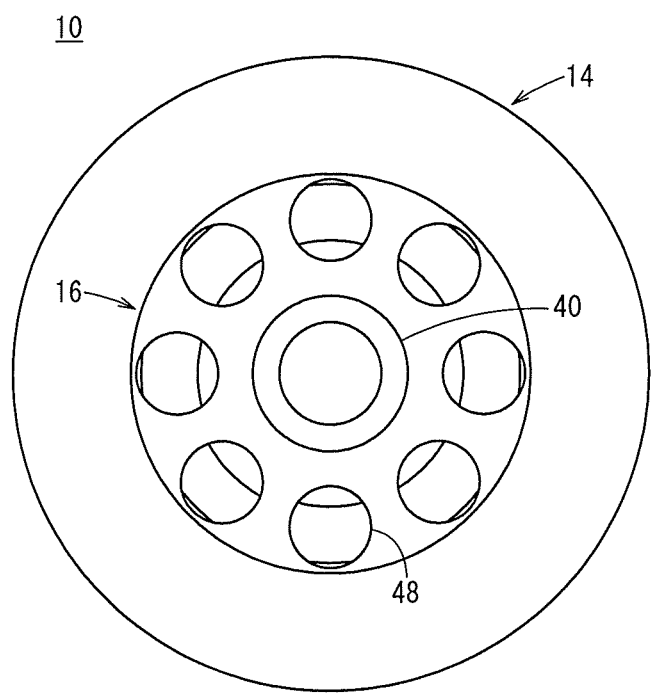
FIG. 2 is a bottom view of the vacuum pad shown in FIG. 1.

Hereinafter, a vacuum pad according to the present invention will be described based on several preferred embodiments with reference to the accompanying drawings.

First Embodiment

A vacuum pad 10 according to a first embodiment of the present invention will be described with reference to FIGS. 1 to 4.

The vacuum pad 10 is used for suctioning and transporting a workpiece W and is attached to a transport apparatus (not shown). The vacuum pad 10 includes a support member 12, a bellows 14 and a restriction member 16.

The support member 12 is formed of a metal material such as aluminum alloy, etc. or a resin material in a cylindrical shape, and is attached to a transport apparatus (not shown) to have its axis directed in a vertical direction. The support member 12 has a vacuum passage 20 penetrating vertically, and a lower end of the vacuum passage 20 has a tapered surface 22 expanding in diameter downward. The inclination angle of the tapered surface 22 is set to, for example, 15 degrees. At a lower portion of the support member 12, an annular groove 24 is provided for supporting the bellows 14.

The bellows 14 is formed in a cylindrical shape with, for example, a rubber material having a predetermined elasticity and has a bellows configuration which is freely expandable, contractible and bendable. An upper end of the bellows 14 is large in thickness and extends radially inward in a flange shape, and this inward flange portion 26 is fitted in the annular groove 24 of the support member 12. Thus, the bellows 14 is attached to the support member 12. A lower end portion 28 of the bellows 14 is formed in a shape expanding obliquely downward, and has a tip end which becomes a portion to be in contact with the workpiece W.

An inner wall of the bellows 14 has annular mountains and annular valleys which appear alternately. In the present embodiment, there exist four mountains 30a to 30d. An inner ring 32a engages with a valley between the first mountain 30a and the second mountain 30b, and another inner ring 32b engages with a valley between the second mountain 30b and the third mountain 30c. These inner rings 32a, 32b play a role of restraining the bellows 14 from being crushed to become flat, and are formed of a resin material or a high-hardness rubber material in a ring shape. In place of providing the inner rings 32a, 32b, the bellows 14 may integrally have reinforcing portions corresponding to these inner rings 32a, 32b.

The restriction member 16 is formed of a resin material such as PEEK or the like, in substantially a cylindrical shape. The restriction member 16 has a cylindrical sleeve portion 34 and a flange portion 36 extending radially outward from a lower end of the sleeve portion 34. A tip end of the flange portion 36 slants upward and engages with a slant portion 30e between the third mountain 30c and the fourth mountain 30d on the inner wall of the bellows 14. Thus, the restriction member 16 is attached to the bellows 14. A curved surface 46 recessed upward is defined by both a lower surface of the flange portion 36 close to the sleeve portion 34 and a lower end surface of the sleeve portion 34. That is, the curved surface 46 is formed at the lower surface of the restriction member 16 which faces the workpiece W.

The outer circumference of an upper end portion of the sleeve portion 34 has a tapered surface 38 toward its end, and the angle of inclination at the tapered surface 38 is set to the same as the inclination angle of the tapered surface 22 of the vacuum passage 20. When the bellows 14 is not contracted, the tapered surface 38 of the sleeve portion 34 faces the tapered surface 22 of the vacuum passage 20 with a predetermined gap therebetween. The outside diameter of the sleeve portion 34 excepting the tapered surface 38 is almost the same as or slightly smaller than the inside diameter of the vacuum passage 20 excepting the tapered surface 22, so that the sleeve portion 34 is insertable into the vacuum passage 20.

The sleeve portion 34 has a vertical hole 40 penetrating in the axial direction. The vertical hole 40 opens in an upper end surface of the sleeve portion 34, and also opens in the tapered surface 38 of the sleeve portion 34 through a plurality of first horizontal holes 42. Further, the vertical hole 40 opens in the side surface of the sleeve portion 34 through a plurality of second horizontal holes 44 which are at a position close to the lower side of the sleeve portion 34. The flange portion 36 is provided with a plurality of through holes 48 penetrating in the thickness direction at regular intervals in the circumferential direction.

Figure 3:
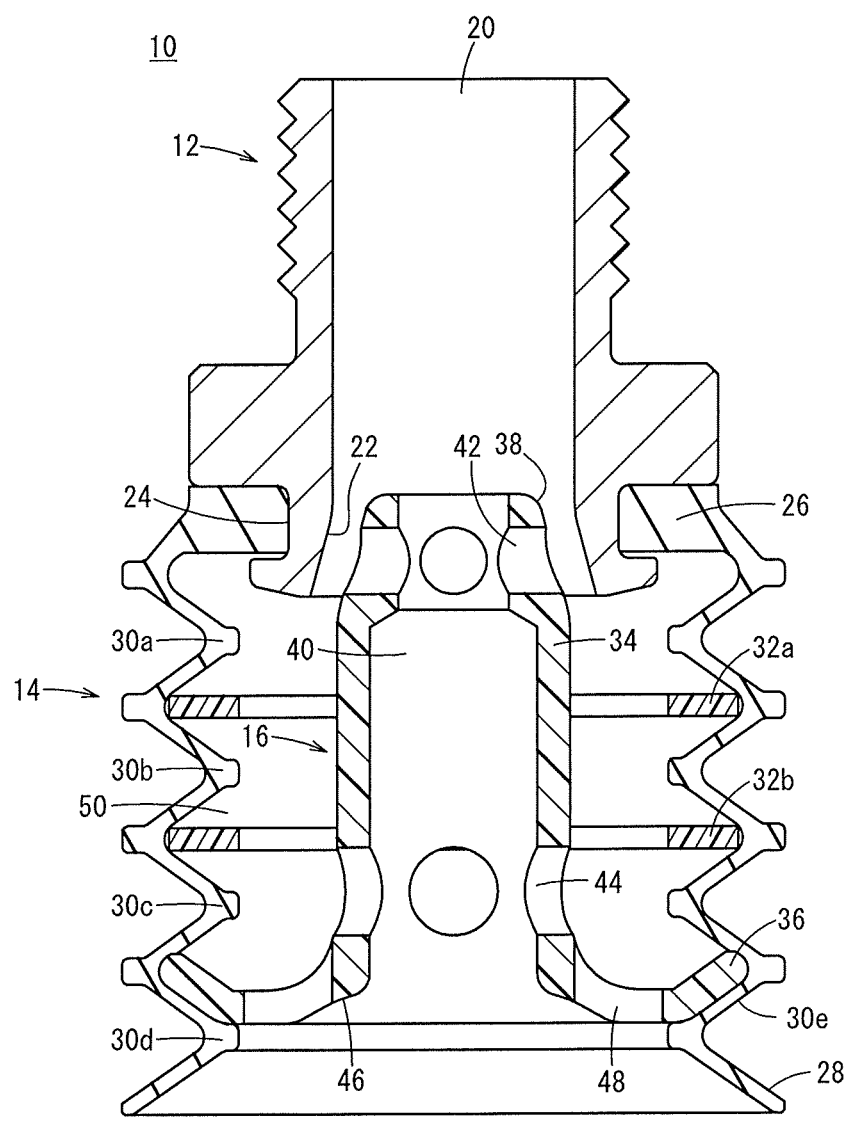
FIG. 3 is a longitudinal sectional view of the vacuum pad shown in FIG. 1.

When the bellows 14 is not contracted, an inner space 50 of the bellows 14 communicates with the vacuum passage 20 of the support member 12 through the second horizontal holes 44 and the vertical hole 40 of the sleeve portion 34 and also communicates with the vacuum passage 20 of the support member 12 through a gap between the tapered surface 38 of the sleeve portion 34 and the tapered surface 22 of the vacuum passage 20 (refer to FIG. 3). When the bellows 14 is contracted, the inner space 50 of the bellows 14 communicates with the vacuum passage 20 of the support member 12 through the second horizontal holes 44 and the vertical hole 40 of the sleeve portion 34 (refer to FIG. 4).

Figure 4:
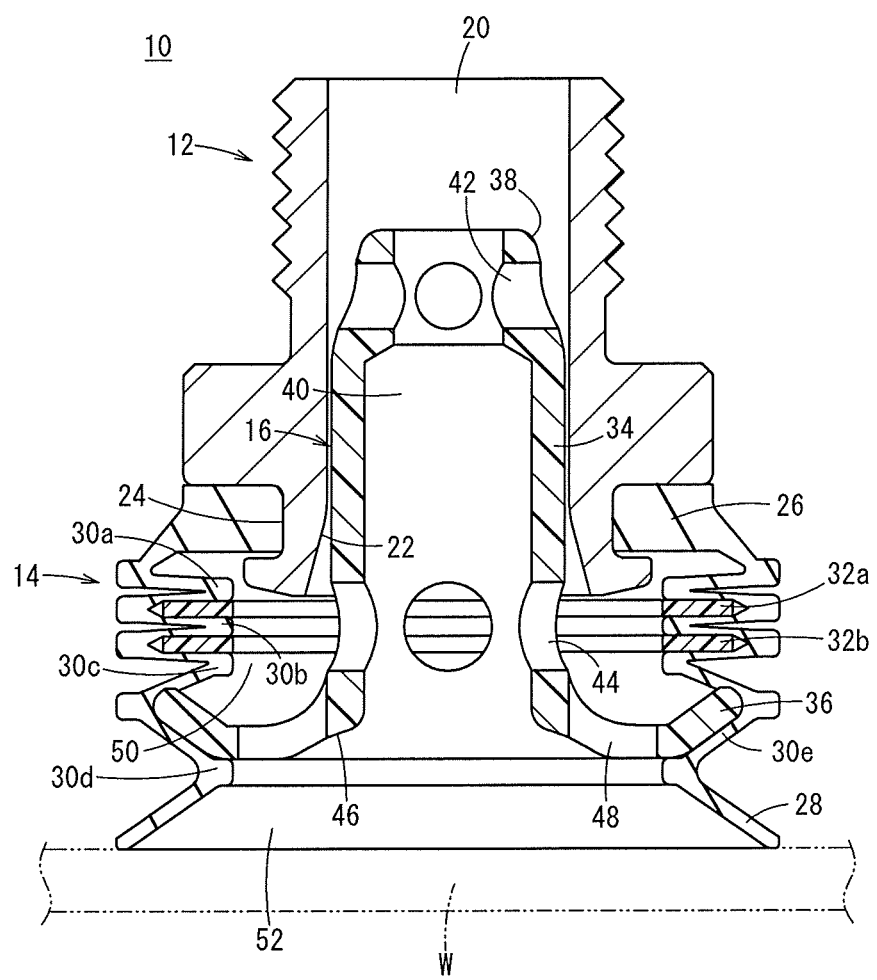
FIG. 4 is a longitudinal sectional view of the vacuum pad shown in FIG. 1 in the most contracted state.

When the bellows 14 is in close contact with the workpiece W including when the bellows 14 is contracted, a space 52 defined between the lower end portion 28 of the bellows 14 and the workpiece W communicates with the vacuum passage 20 of the support member 12 through the vertical hole 40 of the sleeve portion 34, and also communicates with the vacuum passage 20 of the support member 12 through the through holes 48 of the flange portion 36 and the second horizontal holes 44 and the vertical hole 40 of the sleeve portion 34 (refer to FIG. 4).

Figure 5:
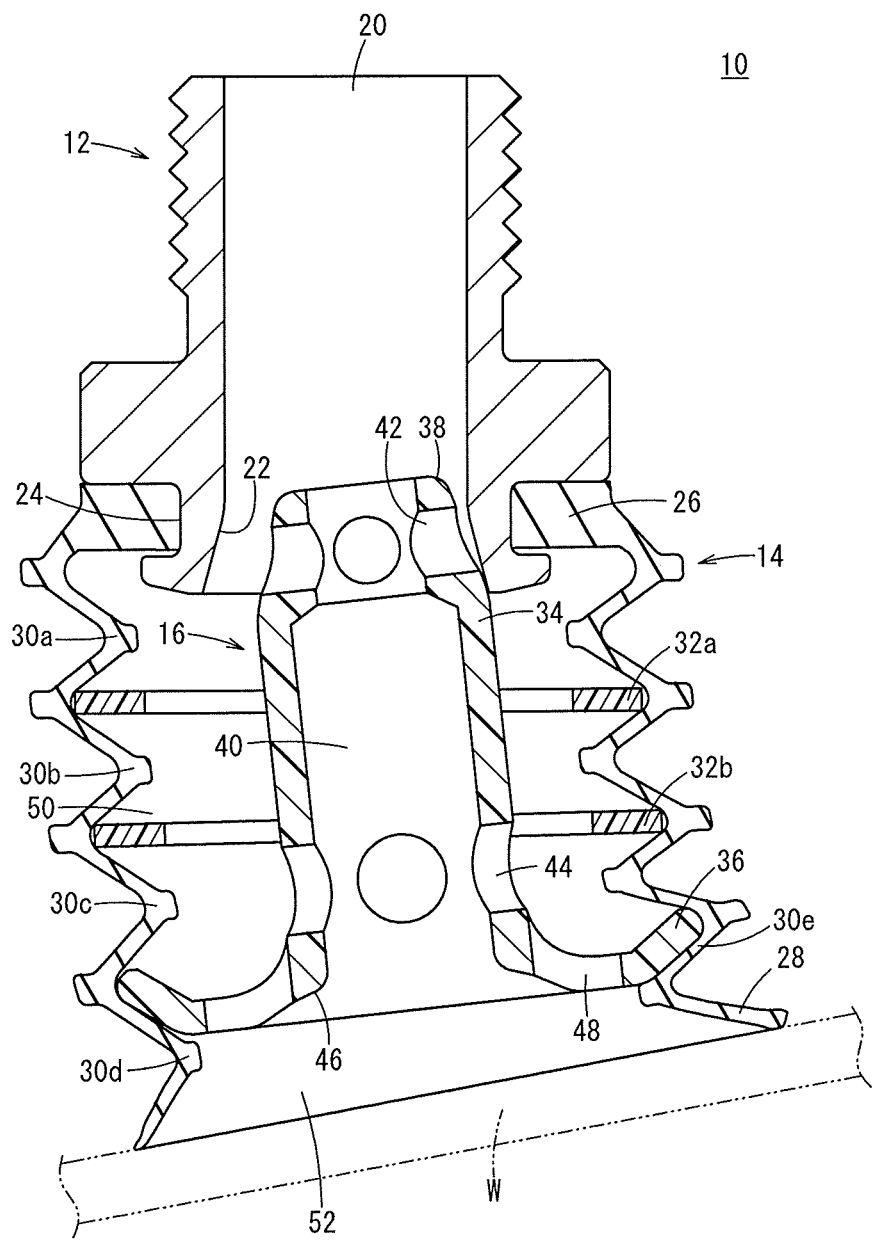
FIG. 5 is a longitudinal sectional view of the vacuum pad shown in FIG. 1 in the state of being in close contact with a workpiece.

The vacuum pad 10 according to the present embodiment is basically configured as described above, and hereafter, the operation will be described with reference to FIGS. 4 and 5.

After the vacuum pad 10 is positioned over the workpiece W by the transporting apparatus (not shown), the vacuum pad 10 is moved downward toward the workpiece W. Here, because the workpiece W has various surface shapes and because it may be the case that the workpiece W is placed with itself inclined, the suctioned surface of the workpiece W is often inclined relative to the horizontal plane.

In the case where the suctioned surface of the workpiece W is inclined relative to the horizontal plane, the lower end portion 28 of the bellows 14 is first brought into contact with the workpiece W only at a portion of its tip end. Then, when the vacuum pad 10 is pressed downward toward the workpiece W, the bellows 14 is contracted as a whole while being bent to follow the inclination of the suctioned surface of the workpiece W. Then, the lower end portion 28 of the bellows 14 is brought into contact with the workpiece W over the whole circumference of its tip end. That is, the bellows 14 is in close contact with the workpiece W (refer to FIG. 5). An impact produced when the bellows 14 is brought into contact with the workpiece W is absorbed by the elasticity of the bellows 14.

Incidentally, because a gap is provided between the tapered surface 38 of the sleeve portion 34 and the tapered surface 22 of the vacuum passage 20, the axis of the restriction member 16 (the axis of the sleeve portion 34) is allowed to be inclined relative to the vertical direction, so that no problem arises during the bending operation of the bellows 14 to which the restriction member 16 is attached. Further, it is needless to say that the bellows 14 will be brought into close contact with the workpiece W without being bent in the case where the suctioned surface of the workpiece W is held horizontally.

A vacuum pressure is produced in the vacuum passage 20 of the support member 12 together with the downward movement of the vacuum pad 10 or after the close contact of the bellows 14 with the workpiece W. When the bellows 14 is brought into close contact with the workpiece W, the vacuum pressure acts effectively, and the bellows 14 is further contracted while restoring the bent state to the original. Along with the contraction of the bellows 14, the restriction member 16 comes into the vacuum passage 20 of the support member 12 while varying the posture such that its axis (or an axial direction thereof) comes close to the vertical direction. The main reason why the axis of the restriction member 16 comes close to the vertical direction is that the sleeve portion 34 is brought into contact with and guided along the inner wall of the vacuum passage 20. Also, the reason is that the elastic restoring force urges the bellows 14 to return to an unbent shape as well as that the weight of the workpiece W applies a force in the vertical direction to the bellows 14.

Subsequently, after the axis of the restriction member 16 is aligned with the axis of the vacuum passage 20, the restriction member 16 is inserted into the vacuum passage 20 of the support member 12 until the bellows 14 becomes the most contracted state. As a result, there comes a state that the restriction member 16 is prevented from being inclined (refer to FIG. 4).

In the most contracted state of the bellows 14, the inner space 50 of the bellows 14 is in communication with the vacuum passage 20 of the support member 12 through the second horizontal holes 44 and the vertical hole 40 of the sleeve portion 34. Further, the space 52 between the lower end portion 28 of the bellows 14 and the workpiece W is in communication with the vacuum passage 20 of the support member 12 through the vertical hole 40 of the sleeve portion 34 and is also in communication with the vacuum passage 20 of the support member 12 through the through holes 48 of the flange portion 36 and the second horizontal holes 44 and the vertical hole 40 of the sleeve portion 34. Accordingly, the state that the bellows 14 is contracted and the state that the workpiece W is suctioned can be stably kept by the action of the vacuum pressure. Because the workpiece W is transported in this state, the holding posture of the workpiece W is stable, and thus, the workpiece W is not swung.

Incidentally, it may be the case that a bag or the like that contains a processed product having fluidity is suctioned and transported as a workpiece. In the present embodiment, because the restriction member 16 which is provided with the flange portion 36 extending radially outward from the lower end of the sleeve portion 34 is disposed on the lower end side of the bellows 14, the workpiece is restrained from being drawn inside the vacuum pad 10 while being deformed.

According to the present embodiment, even in the case where the suctioned surface of the workpiece W is inclined, it is possible to bend the bellows 14 with no problem, and hence, to make the bellows 14 in close contact with the workpiece W. Further, when the bellows is contracted, the restriction member 16 attached to the bellows 14 is inserted into the vacuum passage 20 of the support member 12, and thus, the inclination of the restriction member 16 is prevented, so that the holding posture of the workpiece W becomes stable. Incidentally, in the present embodiment, since the curved surface 46 is formed at the lower surface of the restriction member 16 facing the workpiece W, the vacuum pad 10 is suitable to the case of suctioning bag-shape workpieces which are easy to deform, besides hard workpieces which do not deform.

Second Embodiment

Figure 6:
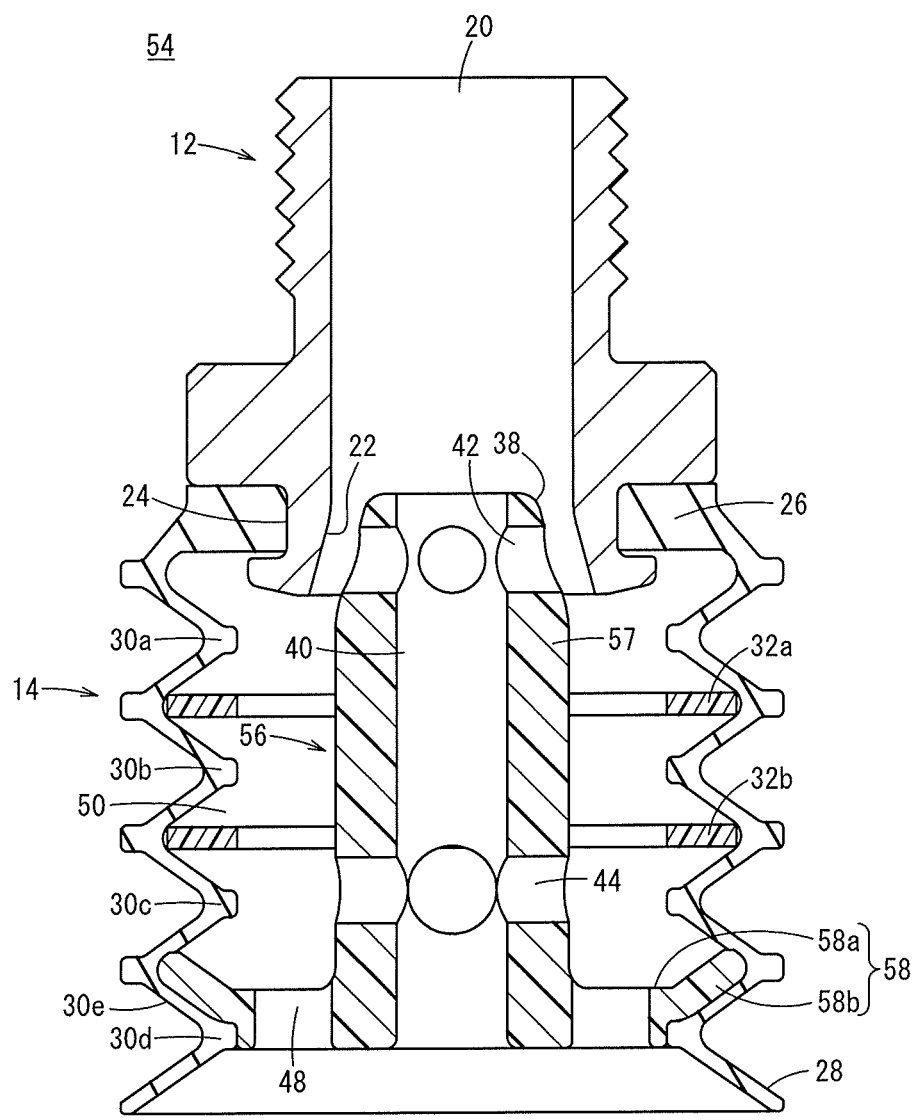
FIG. 6 is a longitudinal sectional view of a vacuum pad according to a second embodiment of the present invention.

Next, a vacuum pad 54 according to a second embodiment of the present invention will be described with reference to FIG. 6. The second embodiment differs from the first embodiment in the configuration of a restriction member 56. Incidentally, in the vacuum pad 54 according to the second embodiment, components being identical or equivalent to those in the foregoing vacuum pad 10 are given the same reference numerals and detailed description thereof will be omitted.

The restriction member 56 has a cylindrical sleeve portion 57 and a flange portion 58 extending radially outward from a lower end of the sleeve portion 57. The flange portion 58 has a horizontal portion 58a extending radially outward in the horizontal direction and a slant portion 58b extending obliquely upward from a tip end of the horizontal portion 58a. The horizontal portion 58a protrudes downward relative to the slant portion 58b. The flange portion 58 engages with a portion of the inner wall of the bellows 14 which extends from a slant portion 30e between the third mountain 30c and the fourth mountain 30d over the fourth mountain 30d. Thus, the restriction member 56 is attached to the bellows 14.

The lower end surface of the sleeve portion 57 and the lower surface of the horizontal portion 58a of the flange portion 58 lie on the same plane. For this reason, the present embodiment is suitable to a case of suctioning, in particular, a film or a thin workpiece.

Third Embodiment

Next, a vacuum pad 60 according to a third embodiment of the present invention will be described with reference to FIGS. 7 and 8. The third embodiment differs from the first embodiment in the configuration of a restriction member 62. Incidentally, in the vacuum pad 60 according to the third embodiment, components being identical or equivalent to those in the foregoing vacuum pad 10 are given the same reference numerals and detailed description thereof will be omitted.

The restriction member 62 has a cylindrical sleeve portion 64 and a flange portion 36 extending radially outward from a lower end of the sleeve portion 64. The outer circumference of an upper end portion of the sleeve portion 64 has a tapered surface 68 becoming thinner toward an end, and the angle of inclination at the tapered surface 68 is set to the same as the inclination angle of the tapered surface 22 of the vacuum passage 20. The outside diameter of the sleeve portion 64 excepting the vicinity of the end of the tapered surface 68 is larger than the inside diameter of the vacuum passage 20 of the support member 12 excepting the tapered surface 22.

The axial length of the sleeve portion 64 is shorter than that of the sleeve portion 34 in the first embodiment. The sleeve portion 64 has a vertical hole 70 extending axially inside. The vertical hole 70 extends to an upper end of the sleeve portion 64 to open in an upper end surface of the sleeve portion 64 and also opens in the side surface of the sleeve portion 64 through a plurality of horizontal holes 72.

Figure 7:
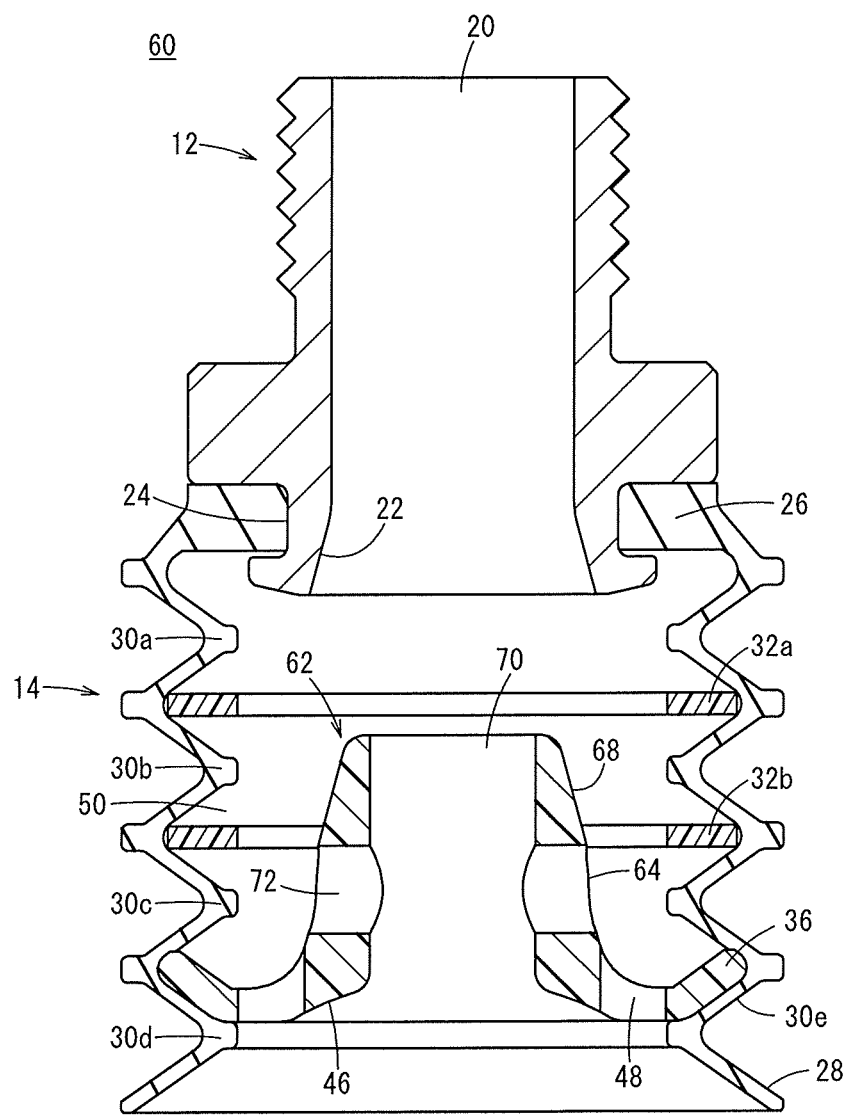
FIG. 7 is a longitudinal sectional view of a vacuum pad according to a third embodiment of the present invention.

When the bellows 14 is not contracted, the restriction member 62 is spaced apart from the support member 12 in the axial direction (refer to FIG. 7). Thus, when the bellows 14 is pressed in contact with the workpiece W, the bellows 14 is able to be bent freely within an elastic range thereof.

In the case where the suctioned surface of the workpiece W is inclined relative to the horizontal plane, when the vacuum pad 60 is pressed downward toward the workpiece W, the bellows 14 is in close contact with the workpiece W while being bent and contracted as a whole. Subsequently, when the vacuum pressure acts effectively, the bellows 14 is further contracted while restoring the bent state to the original. Along with the contraction of the bellows 14, the restriction member 62 attached to the bellows 14 varies its posture such that its axis (or an axial direction thereof) comes close to the vertical direction, and the restriction member 62 reaches a position where the tapered surface 68 of the sleeve portion 64 is brought into abutment on the tapered surface 22 of the vacuum passage 20.

Figure 8:
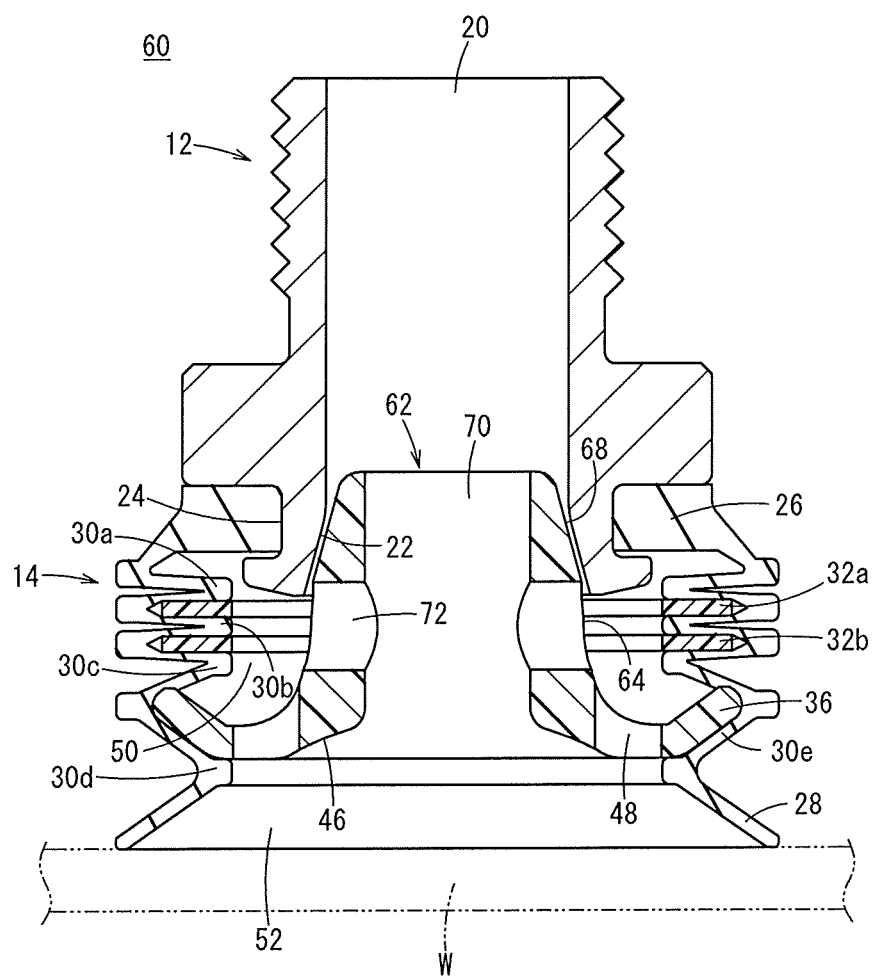
FIG. 8 is a longitudinal sectional view of the vacuum pad shown in FIG. 7 in the most contracted state.

Then, at a position where the tapered surface 68 of the sleeve portion 64 completely fits in the tapered surface 22 of the vacuum passage 20, the bellows 14 becomes the state of being most contracted (refer to FIG. 8). At this time, the axis of the restriction member 62 is aligned with the axis of the support member 12, and the restriction member 62 and the support member 12 are in surface-to-surface contact with each other at their respective tapered surfaces, so that the inclination of the restriction member 62 is prevented reliably.

When the bellows 14 is in close contact with the workpiece W including when the bellows 14 is contracted, the space 52 defined between the lower end portion 28 of the bellows 14 and the workpiece W communicates with the vacuum passage 20 of the support member 12 through the vertical hole 70 of the sleeve portion 64, and communicates with the vacuum passage 20 of the support member 12 also through the through holes 48 of the flange portion 36 and the horizontal holes 72 and the vertical hole 70 of the sleeve portion 64 (refer to FIG. 8).

According to the present embodiment, because the restriction member 62 is spaced apart from the support member 12 in the axial direction when the bellows 14 is not contracted, it is possible to increase the degree of freedom in bending deformation of the bellows 14 when the bellows 14 is brought into close contact with the workpiece W.

Fourth Embodiment

Figure 9:
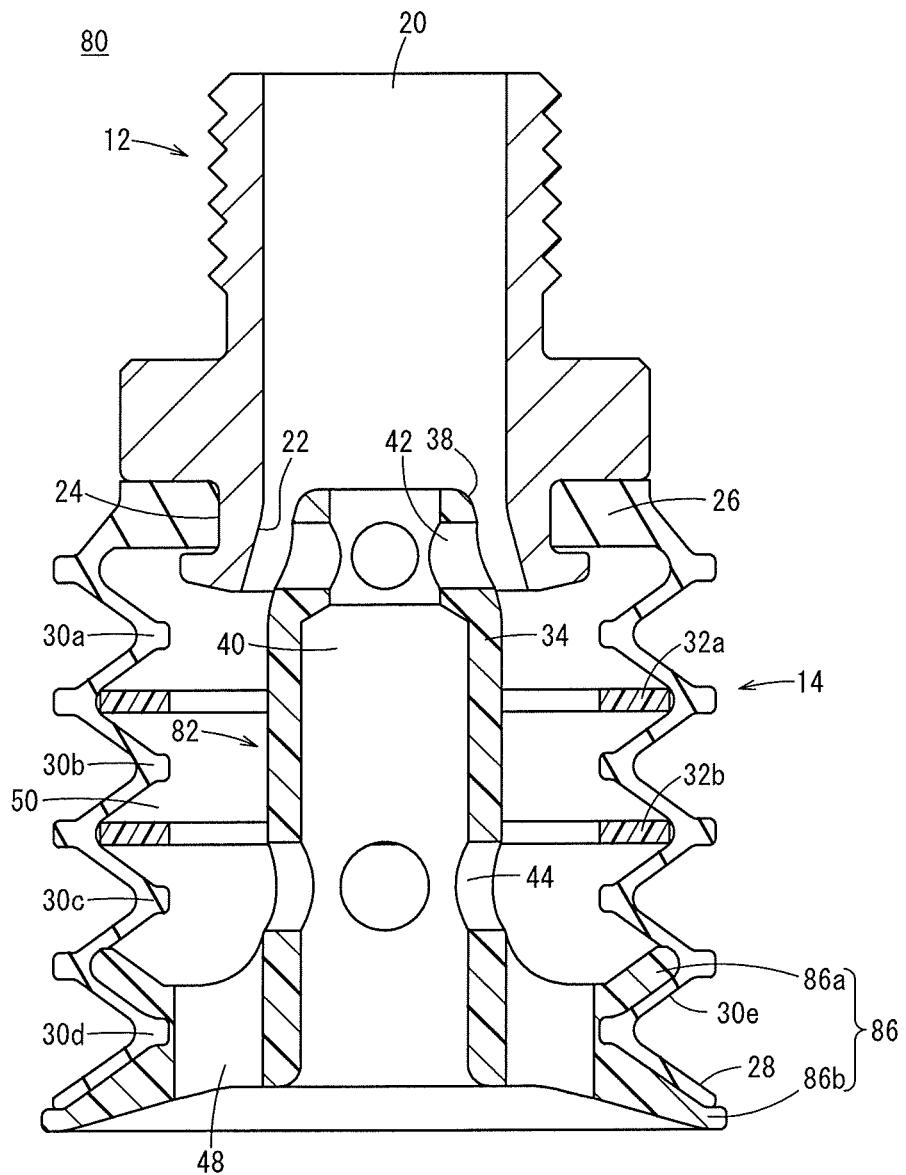
FIG. 9 is a longitudinal sectional view of a vacuum pad according to a fourth embodiment of the present invention.

Next, a vacuum pad 80 according to a fourth embodiment of the present invention will be described with reference to FIG. 9. The fourth embodiment differs from the first embodiment in the configuration of a restriction member 82. Incidentally, in the vacuum pad 80 according to the fourth embodiment, components being identical or equivalent to those in the foregoing vacuum pad 10 are given the same reference numerals and detailed description thereof will be omitted.

The restriction member 82 is formed of a metal material or a conductive resin material in substantially a cylindrical shape. The restriction member 82 has a cylindrical sleeve portion 34 and a flange portion 86 extending radially outward from a lower end of the sleeve portion 34. The flange portion 86 is bifurcated at its tip end and has a first flange portion 86a slanting upward and a second flange portion 86b slanting downward.

The flange portion 86 engages with the inner wall of the bellows 14 in such a manner that the first flange portion 86a and the second flange portion 86b sit astride the fourth mountain 30d on the inner wall of the bellows 14 (or the fourth mountain 30d is put between the first flange portion 86a and the second flange portion 86b). Thus, the restriction member 82 is attached to the bellows 14.

The tip end of the second flange portion 86b extends outward beyond the tip end of the lower end portion 28 of the bellows 14, and the second flange portion 86b covers the bellows 14 from the lower side. That is, the tip end of the second flange portion 86b becomes a portion which is brought into contact with the workpiece W. The bottom shape of the restriction member 82 including the second flange portion 86b may be varied (to a plane or a curved surface) in dependence on the kinds of workpieces.

The present embodiment is suitable to the case where it is required not to leave any suction mark on the workpiece, for example, to the case where the workpiece is a glass plate. In the case where the bellows 14 formed of a rubber material is brought into contact with a workpiece, oil in the rubber may come out on the surface to be transported to the workpiece, so that a suction mark is likely to remain on the workpiece. In the present embodiment, what is brought into contact with the workpiece is not the bellows 14 but the restriction member 82. Then, since the restriction member 82 is not formed of a rubber material, any suction mark does not remain on the workpiece. In this case, it is suitable to choose PEEK resin as a material for the restriction member 82.

Further, the present embodiment is suitable to the case where a workpiece is required to prevent electrification. The restriction member 82 is formed of a metal material or a conductive resin material, and thus, even when the restriction member 82 is electrified upon contact with the workpiece, an electric charge (static electricity) of the restriction member 82 is removed when the restriction member 82 comes into contact with the support member 12 through the insertion of the sleeve portion 34 into the vacuum passage 20. Accordingly, the electrification of the workpiece can be prevented. Incidentally, the material of the support member 12 is limited to a metal material in the present embodiment, though it may be a metal material or a resin material in the first embodiment.

According to the present embodiment, no suction mark remains on the workpiece. Further, even when the restriction member 82 is electrified upon contact with the workpiece, it is possible to remove such electrification.

Fifth Embodiment

Figure 10:
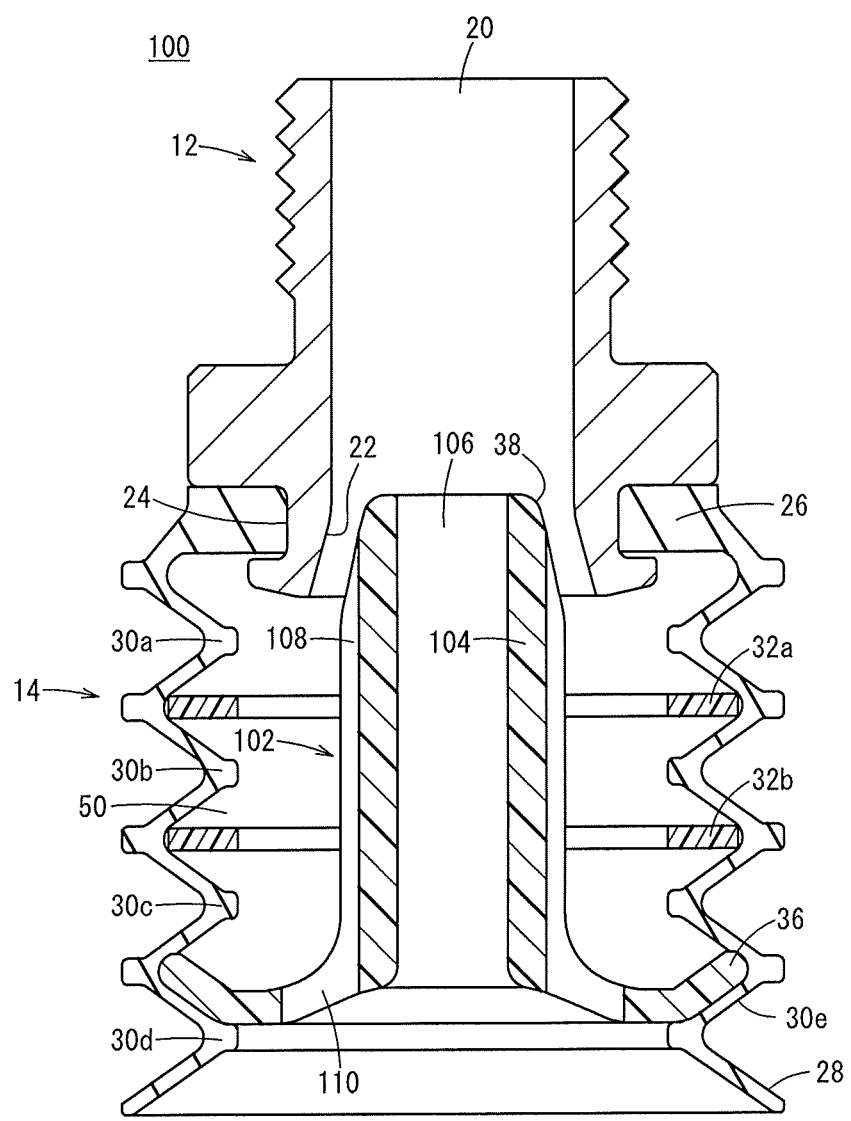
FIG. 10 is a longitudinal sectional view of a vacuum pad according to a fifth embodiment of the present invention.

Next, a vacuum pad 100 according to a fifth embodiment of the present invention will be described with reference to FIGS. 10 to 12. The fifth embodiment differs from the first embodiment in the configuration of a restriction member 102. Incidentally, in the vacuum pad 100 according to the fifth embodiment, components being identical or equivalent to those in the foregoing vacuum pad 10 are given the same reference numerals and detailed description thereof will be omitted.

The restriction member 102 has a cylindrical sleeve portion 104 and a flange portion 36 extending radially outward from a lower end of the sleeve portion 104. The outer circumference of an upper end portion of the sleeve portion 104 has a tapered surface 38 becoming thinner toward an end, and the angle of inclination at the tapered surface 38 is set to the same as the inclination angle of the tapered surface 22 of the vacuum passage 20. When the bellows 14 is not contracted, the tapered surface 38 of the sleeve portion 104 faces the tapered surface 22 of the vacuum passage 20 with a predetermined gap therebetween. The outside diameter of the sleeve portion 104 excepting the tapered surface 38 is substantially the same as or slightly smaller than the inside diameter of the vacuum passage 20 excepting the tapered surface 22, so that the sleeve portion 104 is insertable into the vacuum passage 20.

The sleeve portion 104 is provided with a vertical hole 106 penetrating in the axial direction. As shown in FIG. 12, a plurality of slit-shape grooves 108 extending in the axial direction are provided on the outer circumferential surface of the sleeve portion 104 at regular intervals in the circumferential direction. A plurality of through holes 110 penetrating in the thickness direction are provided in the flange portion 36 at positions being in alignment with the grooves 108 on the sleeve portion 104. That is, the respective through holes 110 at the flange portion 36 are connected to the respective grooves 108 on the sleeve portion 104.

Figure 11:
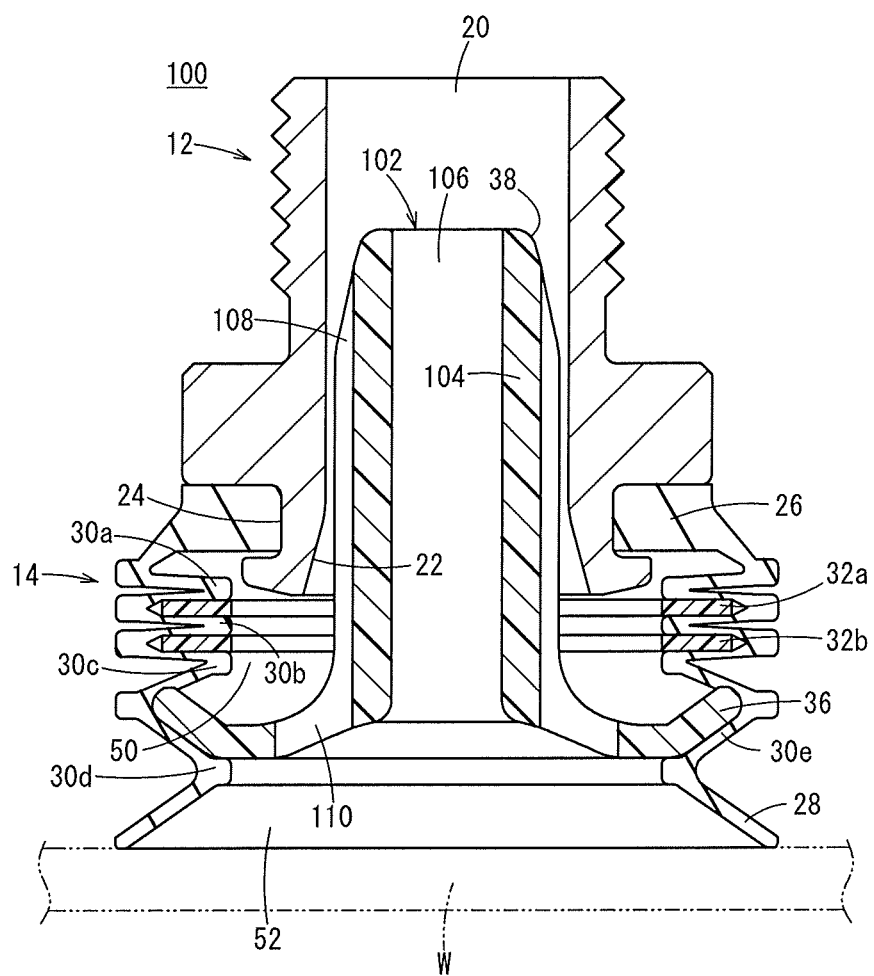
FIG. 11 is a longitudinal sectional view of the vacuum pad shown in FIG. 10 in the most contracted state.
Figure 12:
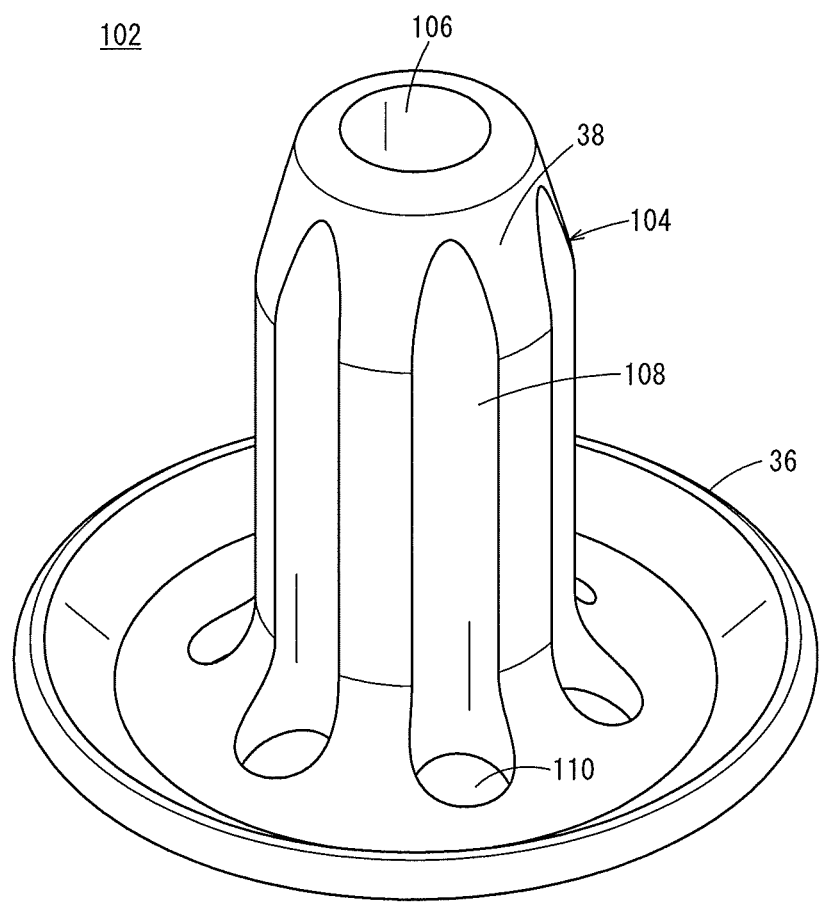
FIG. 12 is a perspective view of a restriction member in the vacuum pad shown in FIG. 10.

When the sleeve portion 104 of the restriction member 102 is inserted into the vacuum passage 20 of the support member 12, the plurality of grooves 108 can secure sufficient gaps between the sleeve portion 104 and the wall surface of the vacuum passage 20, so that the inner space 50 of the bellows 14 can satisfactorily hold the state of being in communication with the vacuum passage 20 (refer to FIG. 11). Further, the space 52 defined between the lower end portion 28 of the bellows 14 and the workpiece W communicates with the vacuum passage 20 of the support member 12 through the vertical hole 106 of the sleeve portion 104.

According to the present embodiment, the sleeve portion 104 is provided with the vertical hole 106 and is provided with the slit-shape grooves 108 on the outer circumferential surface thereof, and the flange portion 36 is provided with the through holes 110 connected to the grooves 108 on the sleeve portion 104. Accordingly, the state that the bellows 14 is contracted and the state that the workpiece W is suctioned can be kept stably by the vacuum pressure.

The vacuum pad according to the present invention is not limited to the foregoing respective embodiments. The present invention may, of course, take various configurations without departing from the gist of the present invention.

What is claimed is:

1. A vacuum pad for suctioning a workpiece by utilizing a vacuum pressure, the vacuum pad comprising:
   a support member including a vacuum passage inside;
   a bellows secured to the support member; and
   a restriction member attached to an inner side of the bellows;
   wherein the restriction member comes into the vacuum passage when the bellows is contracted, and
   the restriction member is prevented from being inclined relative to the support member when the bellows is contracted, and the restriction member is allowed to be inclined relative to the support member when the bellows is not contracted,
   wherein the restriction member has a through hole opening to a space between the restriction member and the bellows.

2. The vacuum pad according to claim 1, wherein an inner ring is attached to an inner wall of the bellows.

3. The vacuum pad according to claim 1, wherein:
   the restriction member includes a sleeve portion configured to be inserted into the vacuum passage and a flange portion extending outward from one end portion of the sleeve portion; and
   a tip end of the flange portion engages with an inner wall of the bellows.

4. The vacuum pad according to claim 3, wherein:
   another end portion of the sleeve portion is formed as a tapered surface becoming thinner toward an end; and
   an end portion of the vacuum passage is formed as a tapered surface expanding in diameter.

5. The vacuum pad according to claim 4, wherein when the bellows is not contracted, the tapered surface of the sleeve portion faces the tapered surface of the vacuum passage through a gap.

6. The vacuum pad according to claim 4, wherein when the bellows is not contracted, the restriction member is spaced apart from the support member in an axial direction.

7. The vacuum pad according to claim 3, wherein the sleeve portion is provided with a vertical hole penetrating in an axial direction and a horizontal hole communicating with the vertical hole and opening in a side surface of the sleeve portion.

8. A vacuum pad for suctioning a workpiece by utilizing a vacuum pressure, the vacuum pad comprising:
   a support member including a vacuum passage inside;
   a bellows secured to the support member; and
   a restriction member attached to an inner side of the bellows;
   wherein the restriction member comes into the vacuum passage when the bellows is contracted, and the restriction member is prevented from being inclined relative to the support member when the bellows is contracted, and the restriction mot her is allowed to be inclined relative to the support member when the bellows is not contracted, wherein the restriction member includes a sleeve portion configured to be inserted into the vacuum passage and a flange portion extending outward from one end portion of the sleeve portion;

a tip end of the flange portion engages with an inner wall of the bellows;

the sleeve portion is provided with a vertical hole penetrating in an axial direction;

an outer circumferential surface of the sleeve portion is provided with a slit-shape groove extending in the axial direction; and the flange portion is provided with a through hole penetrating in a thickness direction and being connected to the groove.

9. The vacuum pad according to claim 3, wherein the flange portion has a shape covering a lower end portion of the bellows.

10. The vacuum pad according to claim 9, wherein the restriction member is formed of a metal material or a conductive resin material.

11. The vacuum pad according to claim 1, wherein the restriction member comprises a sleeve that cooperates with a wall of the vacuum passage to substantially align the restriction member with an axis of the vacuum passage only when the sleeve comes into the vacuum passage.

12. The vacuum pad according to claim 8, wherein:
another end portion of the sleeve portion is formed as a tapered surface becoming thinner toward an end; and
an end portion of the vacuum passage is formed as a tapered surface expanding in diameter.

13. The vacuum pad according to claim 12, wherein when the bellows is not contracted, the restriction member is spaced apart from the support member in an axial direction.

14. The vacuum pad according to claim 12, wherein the sleeve portion is provided with a vertical hole penetrating in an axial direction and a horizontal hole communicating with the vertical hole and opening in a side surface of the sleeve portion.

15. The vacuum pad according to claim 12, wherein the flange portion has a shape covering a lower end portion of the bellows.

16. The vacuum pad according to claim 13, wherein the restriction member is formed of a metal material or a conductive resin material.

* * * * *